A. P. BETTERSWORTH.
Pruning-Shears.
No. 148,918. Patented March 24, 1874.
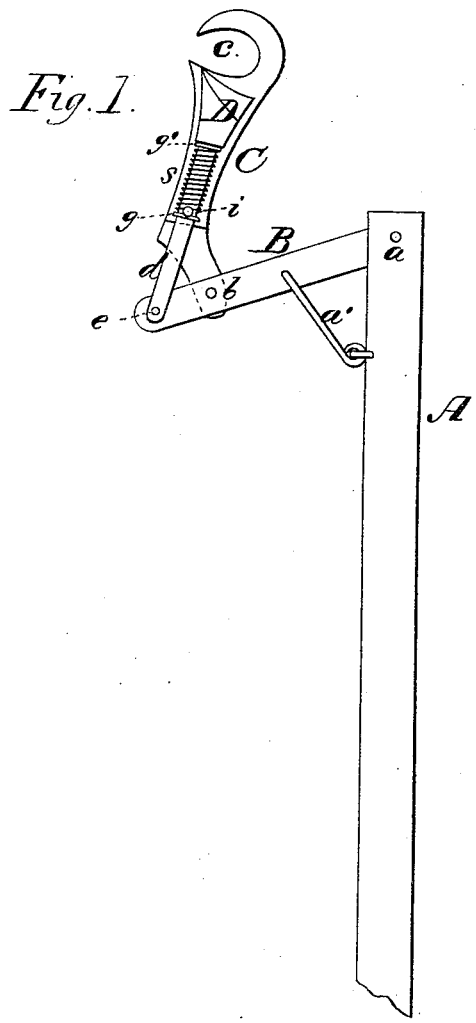
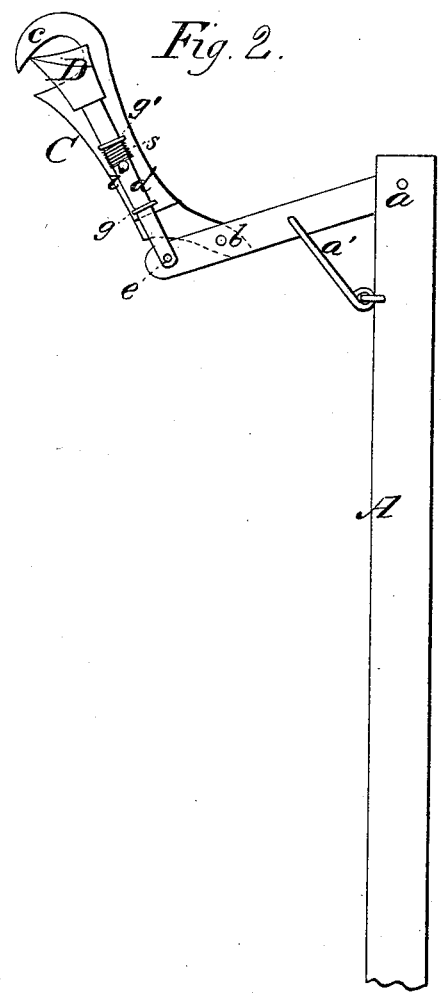
WITNESSES
Mary J. Utley.
George P. Upham.
INVENTOR
A. P. Bettersworth,
By Chipman and Fosmur & Co
ATTORNEYS.

UNITED STATES PATENT OFFICE.

ALEXANDER P. BETTERSWORTH, OF CARLINVILLE, ILLINOIS.

IMPROVEMENT IN PRUNING-SHEARS.

Specification forming part of Letters Patent No. 148,918, dated March 24, 1874; application filed February 21, 1874.

*To all whom it may concern:*

Be it known that I, ALEXANDER P. BETTERSWORTH, of Carlinville, in the county of Macoupin and State of Illinois, have invented a new and valuable Improvement in Pruning-Knives; and I do hereby declare that the following is a full, clear, and exact description of the construction and operation of the same, reference being had to the annexed drawings making a part of this specification, and to the letters and figures of reference marked thereon.

Figure 1 of the drawings is a representation of a side view of my pruning-knife open. Fig. 2 is a side view of the same shut.

This invention has relation to pruning-knives, and is an improvement on Letters Patent numbered 143,659. It consists in a hooked cutter, in combination with sliding spring-cutters, which are both pivoted to an arm that is fixed rigidly to one end of a long handle, whereby a very simple pruning-knife is obtained which can be operated by a simple manipulation of the handle, as will be hereinafter explained.

The following is a description of my invention.

In the annexed drawing, A designates the handle of the instrument, which may be of any desired length, and B is an arm, which is connected to the handle at $a$ and also secured to it by means of a rigid brace-rod, $a'$. The outer portion of the arm B has pivoted to it, at $b$, the shank C of a hooked cutter, $c$, and to the outer end of this arm the shank $d$ of a straight-edge cutter, D, is pivoted at $e$. The two cutters are thus allowed to vibrate freely on their supporting-arm B. The shank $d$ of cutter D plays freely and longitudinally through staples $g\ g'$, which are fixed into one side of the shank C of the hooked cutter $c$; and between these staples or guides $g\ g$ a spring, $s$, is coiled around the shank $d$, which spring is compressed between the staple $g'$ and a pin, $i$, inserted into the shank $d$. It is by means of the spring $s$ that the cutter D is caused to recede from the hooked cutter $c$ after each cutting-stroke, and to assume the position represented in Fig. 1.

To use this instrument the hooked cutter $c$ is adjusted upon a branch and the handle A is moved backward and a little downward, which movements will flex the two cutters on the arm B, and at the same time cause the cutter D to approach the cutter $c$, thus severing the branch. The spring $s$ will then return the two cutters to the position shown in Fig. 1.

For pruning or trimming branches which are too small and yielding to allow the use of the cutter D, the cutter $c$ may be used like the well-known pruning-hook, owing to the fact that the arm B is rigidly secured to the handle A.

What I claim as new, and desire to secure by Letters Patent, is—

In combination with the hooked cutter $c$ and rigid arm B, the sliding spring-cutter D, pivoted at $e$, and working freely through staples $g\ g$, which are attached to one side of the shank C of the hooked cutter, substantially as specified.

In testimony that I claim the above I have hereunto subscribed my name in the presence of two witnesses.

ALEXANDER P. BETTERSWORTH.

Witnesses:
JAS. K. FURBER,
C. H. C. ANDERSON.